US012328149B1

(12) United States Patent
Jorgenson et al.

(10) Patent No.: US 12,328,149 B1
(45) Date of Patent: Jun. 10, 2025

(54) NOTIFICATION SYSTEM AND APPARATUS

(71) Applicant: Rockwell Collins, Inc., Cedar Rapids, IA (US)

(72) Inventors: Mark B. Jorgenson, Kanata (CA); Maxime Lepage, Drummondville (CA); Robert W. Johnson, Ottawa (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 205 days.

(21) Appl. No.: 18/104,972

(22) Filed: Feb. 2, 2023

(51) Int. Cl.
*H04B 11/00* (2006.01)
*H04B 13/02* (2006.01)

(52) U.S. Cl.
CPC ............. *H04B 11/00* (2013.01); *H04B 13/02* (2013.01)

(58) Field of Classification Search
CPC ........ H04B 1/713; H04B 11/00; H04B 17/26; H04B 17/318; H04B 13/02; H04W 4/80; H04L 1/0002; H04L 1/203; H04L 43/0847; H04L 43/16
USPC .......................................................... 367/134
See application file for complete search history.

(56) References Cited

U.S. PATENT DOCUMENTS

| | | | |
|---|---|---|---|
| 4,639,937 A | 1/1987 | McRae et al. | |
| 6,920,171 B2 * | 7/2005 | Souissi | H04B 1/715 375/132 |
| 8,060,017 B2 * | 11/2011 | Schlicht | H04L 1/0015 455/41.2 |
| 8,155,044 B2 | 4/2012 | Yim et al. | |
| 8,243,603 B2 * | 8/2012 | Gossain | H04W 40/28 455/445 |
| 9,788,257 B2 * | 10/2017 | Singh | H04W 40/246 |
| 10,368,338 B2 * | 7/2019 | Chiba | H04W 72/02 |
| 11,190,862 B1 | 11/2021 | Jorgenson et al. | |
| 11,382,143 B1 | 7/2022 | Stevens et al. | |
| 11,394,423 B2 | 7/2022 | Tsai et al. | |
| 11,411,613 B2 | 8/2022 | Jorgenson et al. | |
| 11,464,009 B2 | 10/2022 | Woods et al. | |
| 2002/0075941 A1 * | 6/2002 | Souissi | H04B 1/715 375/133 |
| 2003/0031208 A1 * | 2/2003 | Anehem | H04W 28/14 370/474 |
| 2006/0133543 A1 * | 6/2006 | Linsky | H04B 1/715 375/350 |
| 2007/0127379 A1 * | 6/2007 | Gossain | H04L 45/22 370/235 |
| 2008/0186893 A1 * | 8/2008 | Kolding | H04W 52/0235 370/311 |

(Continued)

*Primary Examiner* — Daniel L Murphy
*Assistant Examiner* — Amie M Ndure
(74) *Attorney, Agent, or Firm* — Suiter Swantz IP

(57) ABSTRACT

A notification system for sending a message to a receiving station via one or more repeater stations is disclosed. The repeater stations receive the message over a channel from a sending station. The distributed network immediately begins transmitting a signal coordinated with the message received where the message appears as multipath to a receiver or set of receivers. This asynchronous relay transmission start minimizes the time to incorporate additional transmitters and allows strong links to be discovered and employed without waiting for synchronized subslot transmission starts. In other operations, an asynchronous scanning operation may be included to provide a sufficient transmission time to account for network worst case net cycle times.

20 Claims, 9 Drawing Sheets

(56) References Cited

U.S. PATENT DOCUMENTS

| | | | |
|---|---|---|---|
| 2010/0091818 A1* | 4/2010 | Sen | H04B 1/715 |
| | | | 375/136 |
| 2010/0182982 A1* | 7/2010 | Yim | H04W 72/569 |
| | | | 370/338 |
| 2012/0087290 A1* | 4/2012 | Rhee | H04W 52/0216 |
| | | | 370/311 |
| 2012/0238851 A1* | 9/2012 | Kamen | A61M 5/14244 |
| | | | 604/151 |
| 2014/0086125 A1* | 3/2014 | Polo | H04W 52/0229 |
| | | | 370/311 |
| 2015/0245351 A1* | 8/2015 | Banerjea | H04W 40/023 |
| | | | 370/338 |
| 2015/0245369 A1* | 8/2015 | Heydon | H04W 12/50 |
| | | | 370/329 |
| 2015/0326274 A1* | 11/2015 | Flood | H04B 17/336 |
| | | | 375/132 |
| 2015/0364033 A1* | 12/2015 | Witkowski | G08C 17/02 |
| | | | 340/5.25 |
| 2016/0088424 A1* | 3/2016 | Polo | H04W 88/04 |
| | | | 455/41.1 |
| 2016/0277064 A1* | 9/2016 | Waxman | H04B 1/713 |
| 2016/0302195 A1* | 10/2016 | Zhang | H04W 4/80 |
| 2016/0323012 A1* | 11/2016 | Kwon | H04B 1/7143 |
| 2017/0127445 A1* | 5/2017 | Lee | H04W 76/19 |
| 2017/0215213 A1* | 7/2017 | Lee | H04B 17/318 |
| 2017/0245204 A1* | 8/2017 | Kumar | H04W 48/16 |
| 2017/0280458 A1* | 9/2017 | Lou | G06F 3/165 |
| 2017/0317906 A1* | 11/2017 | Tsai | H04L 43/0847 |
| 2018/0184268 A1* | 6/2018 | Stitt | H04W 4/80 |
| 2020/0322001 A1* | 10/2020 | Tsai | H04L 1/203 |
| 2021/0282135 A1* | 9/2021 | Woods | H04W 52/46 |
| 2022/0209826 A1* | 6/2022 | Jorgenson | H04W 84/18 |

* cited by examiner

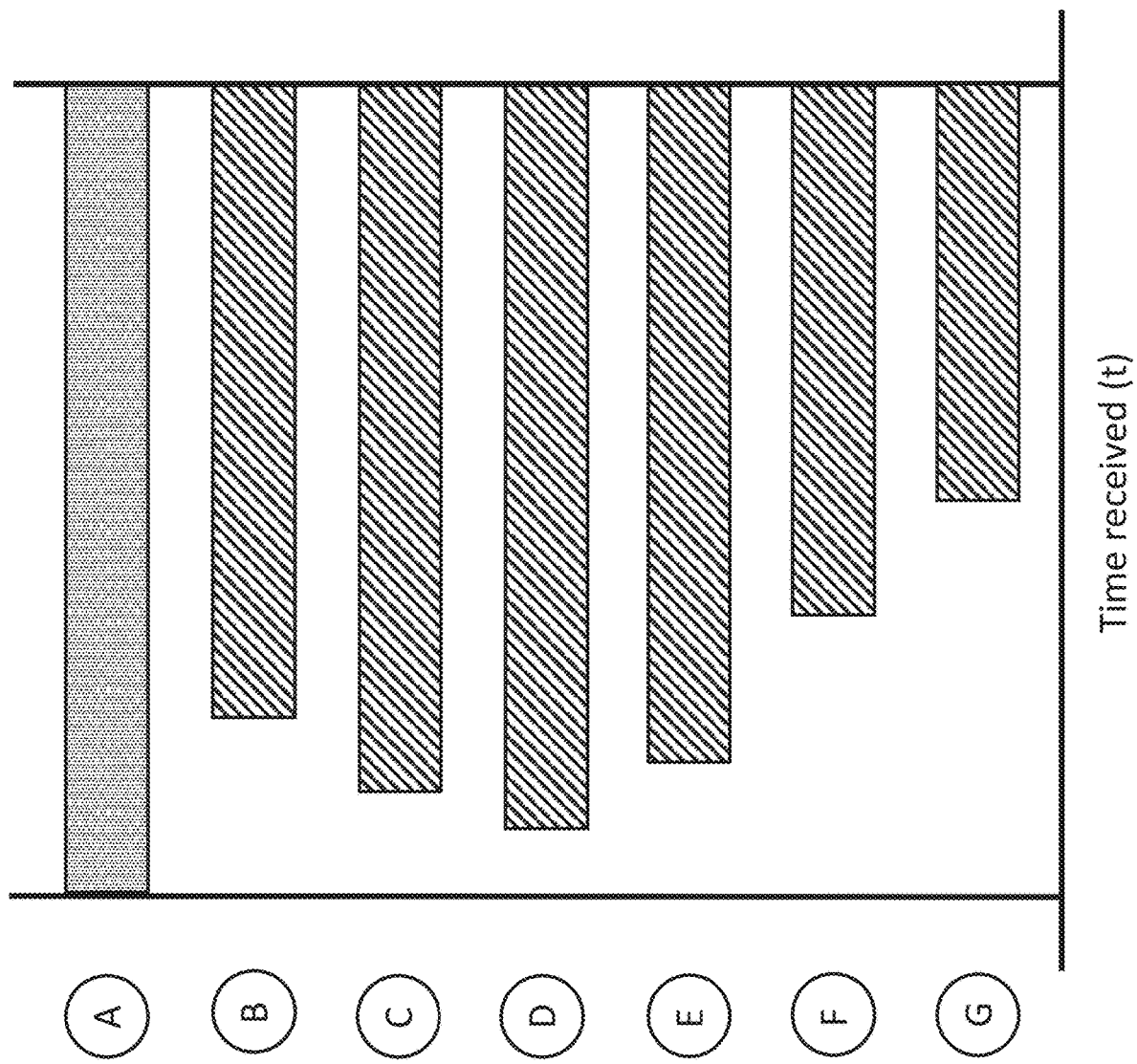

NOTIFICATION SYSTEM AND APPARATUS

TECHNICAL FIELD

The present invention is generally related to communications and more particularly to a notification system for rapidly relaying short messages without utilizing explicit relay subslots through acoustic or radio channels.

BACKGROUND

In a traditional avalanche relay, an agreed upon time dictates when (and which) nodes begin retransmitting. For nodes that receive the signal with high signal-to-noise ratio (SNR), this creates a retransmission delay in at least one receiving node or group of nodes. Although subslot alignment allows other nodes time to detect the signal, after a signal has been received and before retransmission, this slows communications. The agreed upon time delay is traditionally set to accommodate reception between nodes within a distribution of signal-to-noise ratios before retransmission is timed to occur.

SUMMARY

A notification system for sending a short message to a receiving station via one or more repeater stations. The repeater stations receiving the message do not receive the message contemporaneously as each repeater will detect the message at different times. In operation the notification system sending station utilizes at least one transducer coupled to a transmitter controller and processor for monitoring, selecting, and transmitting over a channel selected from a set of channels. Each repeater station including a transmitter coupled to a transducer and repeater controller and processor configured to repeat the message over a selected channel (e.g., selected by a user, a radio, or other vehicle known in the art) upon receipt of the message. The receiver station including a transducer coupled to a receiver for receiving the message from the one or more repeater stations.

In operation receiving station and/or repeater stations of the system and apparatus may acknowledge receipt of the message.

In use, the notification system and method may be a distributed network of synchronously scanning transceivers. The notification system and method may also include asynchronously scanning transceivers. An alternative use may include a staring receiver, where one or more channels are monitored simultaneously. It is noted that the one or more channels may include, but are not limited to, a distinct channel (e.g., acoustic or RF frequency), a particular encoding as employed in code division multiple access (CDMA) systems, a specific hop sequence, or the like. In operation, the network may scan synchronously with a fixed dwell time on each channel of interest. An initiating node starts sending the message at the beginning of a dwell period for synchronous scanning or at any time for asynchronous operation. Any node detecting the notification stops receiving and immediately begins transmitting a signal coordinated with the notification received such that the notification from multiple nodes appears as multipath to the intended receiver or set of receivers. Alternatively, the one or more receivers that may simultaneously monitor one or more channels, allow for the transmissions of the signal to be spread out onto more than one channel. This asynchronous relay transmission start minimizes the time to incorporate additional transmitters and allows strong links served by relays to be discovered and employed without having to wait for synchronized subslot transmission starts. Additionally, the asynchronous start of the relay transmissions allows more relays to be exercised to find nodes across relays in the dwell time than would likely be feasible without allocating multiple fixed subslots.

In other operations of the present system, an asynchronous scanning operation utilizing a sufficient transmission time may be configured to account for network worst case net cycle times.

It is to be understood that both the foregoing general description and the following detailed description are exemplary and explanatory only and are not necessarily restrictive of the invention as claimed. The accompanying drawings, which are incorporated in and constitute a part of the specification, illustrative embodiments of the invention and together with the general description, serve to explain the principles of the invention.

Likewise, for example, the present disclosure teaches a method and apparatus for providing a notification (e.g., alert signal, message, or the like) to a network. The node initiating the notification sends a signal selected from an alphabet of at least one known signal. In operation, a member node detection of a known signal occurs at different times at each receiving member node. Some receiving member nodes receive the known signal (notification) with a higher signal power to noise power than other receiving member nodes. This distribution of signal-to-noise ratio (SNR) between receiving member nodes is leveraged by the present disclosure. As a notification is avalanched, various receiving nodes may immediately retransmit. Thus, nodes with superior SNR may detect and retransmit the notification more quickly than nodes where inferior SNR conditions prevail.

In some embodiments, this disclosure teaches a notification system where each network node begins retransmitting a received message, coordinated with the signal that it has received, as soon as the node has detected the signal. This approach provides the fastest possible spread of the signal (message) from the initiating node to other nodes without the delay associated with, for example, waiting for explicit TDMA timing to start a retransmission.

In currently preferred embodiments, all nodes include a mechanism to define when the network should cease transmission which is not dependent exclusively on initial reception time since a node may initially hear a relay transmission. Two currently preferred mechanisms for defining the cessation of transmission include using (1) a TDMA like timing schema where all nodes stop at the end of a slot, with some agreed upon timing basis, and (2) a signal (message) structure that allows nodes to determine from the signal itself when to stop. In case (2) the same mechanism used for defining the end of the signal can be used to define a timing reference that may be independent of any other source of time. An analogous mechanism can be used to support hop synchronization across an extended network.

BRIEF DESCRIPTION OF DRAWINGS

The numerous advantages of the disclosure may be better understood by those skilled in the art by reference to the accompanying figures in which:

FIGS. 2A and 2B are diagrammatic illustrations of the notification system of FIG. 1, in accordance with one or more embodiments of the present disclosure;

DETAILED DESCRIPTION

Figure 1:
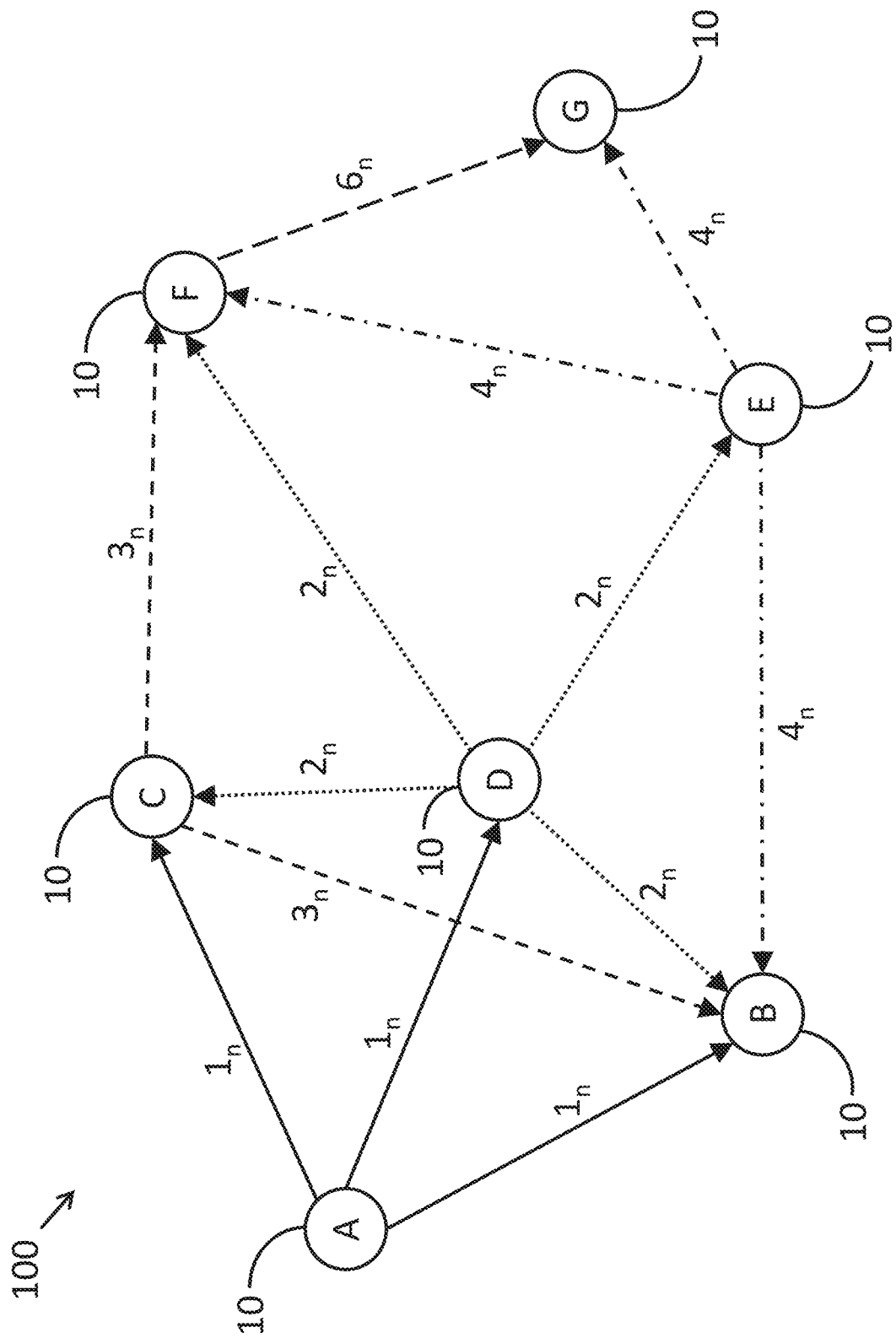
FIG. 1 is a diagrammatic illustration of an exemplary embodiment of a notification system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Broadly, embodiments of the inventive concepts disclosed herein are directed to a notification (e.g., alert signal, message, or the like) system and method for an asynchronous retransmission, slotless, notification network. Retransmission functionality may be more fully understood with reference to U.S. Pat. No. 11,464,009 entitled "Relays in Structured Ad Hoc Networks", which was filed on Mar. 5, 2020 and issued on Oct. 4, 2022, which is hereby incorporated by reference. Additionally, low latency voice and situational awareness services where all nodes hear a transmission and make a coordinated retransmission of the same information in a later, synchronized transmission may be more fully understood with reference to U.S. Pat. No. 11,190,862 entitled "ENHANCED HIGH FREQUENCY AVALANCHE RELAY PROTOCOL", which was filed on Nov. 16, 2020 and issued on Nov. 30, 2021, which is also hereby incorporated by reference. Also incorporated herein by reference is contemporaneously filed nonprovisional patent application entitled "AVALANCHE RELAY LINKING SYSTEM" filed herewith on Feb. 2, 2023, Ser. No. 18/104,886.

In currently preferred embodiments, all nodes include a mechanism to define when to cease transmission which is not dependent exclusively on initial reception time since a node may initially hear a relay transmission. One currently preferred method is to use a TDMA timing scheme that is applicable to each individual signal or message, whereby there is a defined end time for any transmission of a specific signal or message for all nodes. For example, each transmission may end on an integer second, and regardless of whether a node starts a transmission or retransmission at time xx: 00.00 or at time xx: 00.99 the transmission ends at the start of the next second. In another alternative method, the structure of the signal may be chosen to allow the signal to define the time at which the transmission is to cease. For example, the signal may consist of a sequence known to both transmitters and receivers and with the end of transmission corresponding to a specific point in the sequence. This approach also permits such a signal to be used in defining an initial timing reference.

Avalanche relay communication requires network timing. Generally, these requirements are fulfilled by relay slots (and subslots) where each subslot contains the full message. In the case of simple notifications, it is possible to avoid the use of subslots utilized in the more general avalanche relay approach. For the notification signal, the message may be conveyed by notification signal detection. In other cases, the notification signal may convey one or more bits of information encoded into the notification signal. The notification may consist of a Pre-Shared Key (PSK) modulated sequence of predetermined numbers (in the alphabet of {0-7} for 8PSK) known to all nodes in the network. The originator of the notification sequence starts at the beginning of the sequence and the receivers look for that modulated sequence on one or more channels with receivers that are capable of receiving the signal correctly in the presence of multipath. It is noted herein that the one or more channels may include, but are not limited to, a distinct RF frequency, a particular encoding as employed in code division multiple access (CDMA) systems, a specific hop sequence, or any combination of these channels or other channels known in the art. Each node that detects the signal stops receiving and begins transmitting the same sequence with the transmission aligned to the signal that it has received. Alignment of the transmission may include, but is not limited to, the transmitter attempting to match exactly the timing that it is receiving, or it could involve adjusting the timing based on correcting for propagation delays or to introduce artificial multipath where propagation delays are not sufficient. All of the nodes in the network can stop transmitting at a predefined point in time, or a previously agreed upon end point within the sequence can be used to coordinate the simultaneous cessation of transmission by all nodes. The sequence could also be used to indicate selections from within a set of channels for a hopping radio, with the intent of spreading hop synchronization across an extended network, and the same stopping mechanism would apply.

To extend this approach to signals transporting a small number of bits, the alphabet of known signals that may be transmitted must be larger than one. For example, a repeated orthogonally modulated codeword symbol multiplied by a spreading code can be employed. A Walsh code may be utilized in embodiments of the present position (e.g., a linear code1 mapping a binary string of length n to a binary codeword of length 2n). As an example, a 16-ary Walsh symbol carries 4 bits of information spread across 16 chips. A 4-bit notification could consist of the repeated 16-ary Walsh symbol, covered by a spreading code (8PSK pseudo-random sequence for example) known to both the transmitter and the receiver. The receiver applies the despreading sequence and searches for the repeated Walsh symbol. For the case where timing is also to be derived from the signal, a countdown (encoded in one or more alternate Walsh symbols) could be periodically inserted. Smaller Walsh symbols with fewer bits or larger Walsh symbols with more bits could be employed, as could other orthogonal, near-orthogonal or similar modulations. Alternatively, the signal may be encoded in one of $2^M$ unique sequences, providing M bits of information.

Figure 2B:
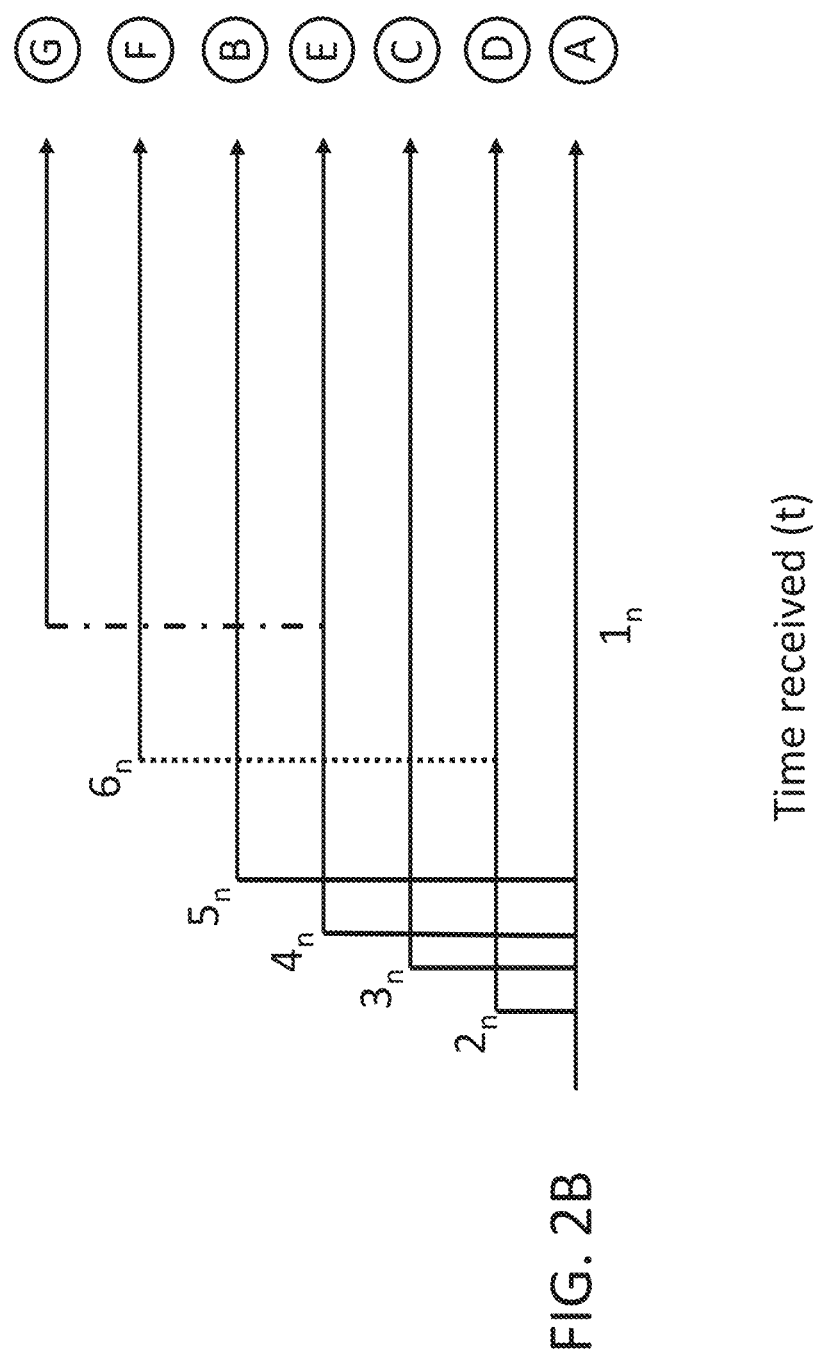
Figure 3:
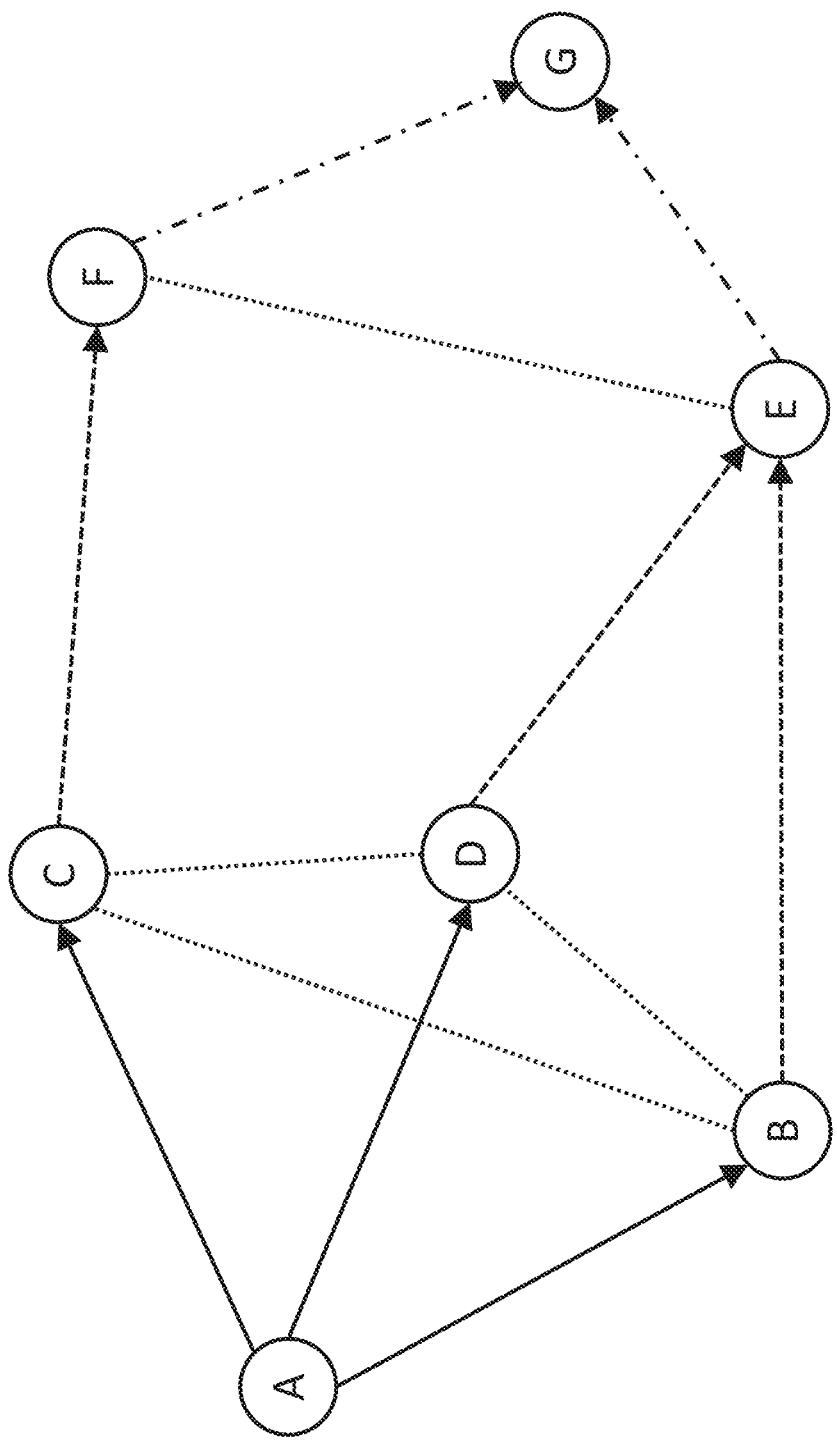
FIG. 3 is a diagrammatic illustration of a prior art Avalanche slotted RF communication system, for comparison with the remaining figures and illustrating the advantages of the present disclosure.
Figure 4A:
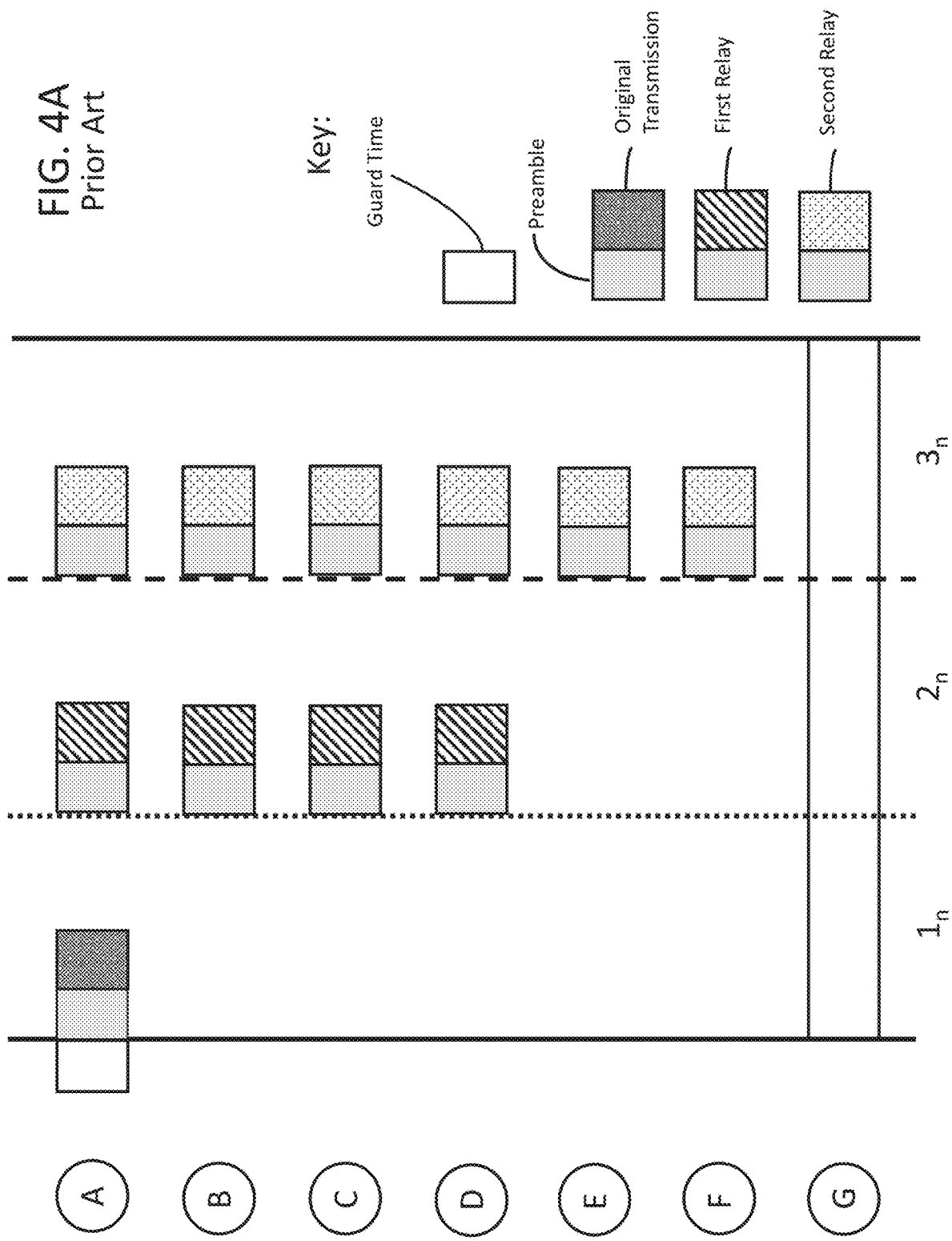
FIGS. 4A and 4B are diagrammatic illustrations of the prior art Avalanche slotted RF communication system of FIG. 3, in accordance with one or more embodiments of the present disclosure.
Figure 4B:
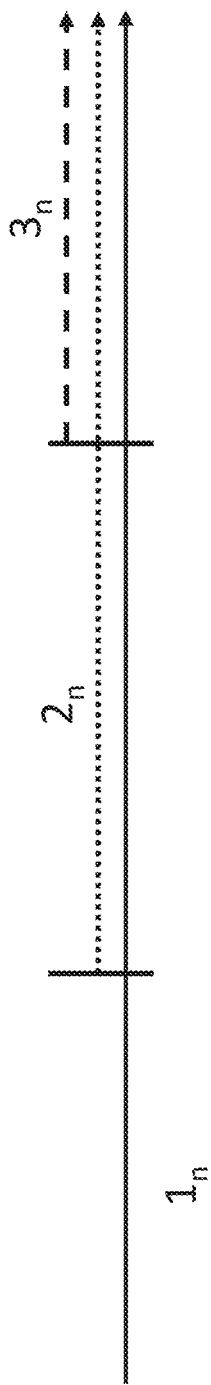

For comparison, a prior art example of an avalanche relay with two relay subslots (3 subslots in total) is illustrated in FIGS. 3-4B. An embodiment of the present invention slotless avalanche relay is illustrated in in FIGS. 1-2B. The topology (reachable neighbors) of FIG. 1 and FIG. 3 is the same in both systems; however, the time and order in which the reachable neighbors receive the signal will vary. In the instant invention (FIG. 1), early detection may allow signals to propagate through relays to other nodes and allow them to begin transmitting before the signal has been detected by all the reachable neighbors of the original transmitting node. As will be noted, with defined relay subslots (FIG. 4A), the prior art requires nodes which can only initiate a relay transmission at defined subslot boundaries. Turning to the illustration of an example prior art slotted relay (FIG. 3), for a signal originated by node A, propagating to neighbors B, C and D over channels indicated by arrows with solid lines, this means that nodes B, C, and D must wait until the subslot boundary before initiating a relay retransmission (each node is designated with the numeral 10). Similarly nodes E and F, which receive relayed transmissions from B, C and indicated by arrows with dashed lines, wait until the next subslot boundary before they relay relaying a transmission to the final node, G, indicated by arrows with dash-dot lines. Dotted lines with no arrows in the figure indicate paths to neighbors that don't contribute to receptions in this example because neighbors have received the message in the same subslot.

Conversely, embodiments of the present invention 100 (FIGS. 1-2B; wherein for illustration purposes each retransmission is labeled 1n, 2n, . . . 6n) provide a new reception and retransmission timing to the topology. In this slotless relay topology (e.g., FIG. 1), node D can begin its transmission of the same signal that A is originating as soon as detected by D. This allows nodes that can hear node D to begin their transmissions as soon as they hear D, which in the illustration (FIGS. 1-2B) allows node E to begin transmitting while still within the interval of the first relay subslot, whereas with the normal avalanche relay formulation (FIG. 4A) it would not be permitted to begin relaying until the start of the second relay subslot. In operation, the signal has been delivered to every node in the network when it is received by the last node. In prior art avalanche relays require slots, as illustrated by example in FIG. 4A, node G never retransmits (in a three-subslot network) and would only retransmit in a network having four (4) or more subslots. Conversely, as illustrated in an illustration of embodiments of the instant invention (FIGS. 2A and 2B) all nodes have received the signal (including G) midway through the time interval corresponding to the first relay subslot, as by example only, in the illustration of a slotted network (e.g., FIG. 4A).

Figure 5:
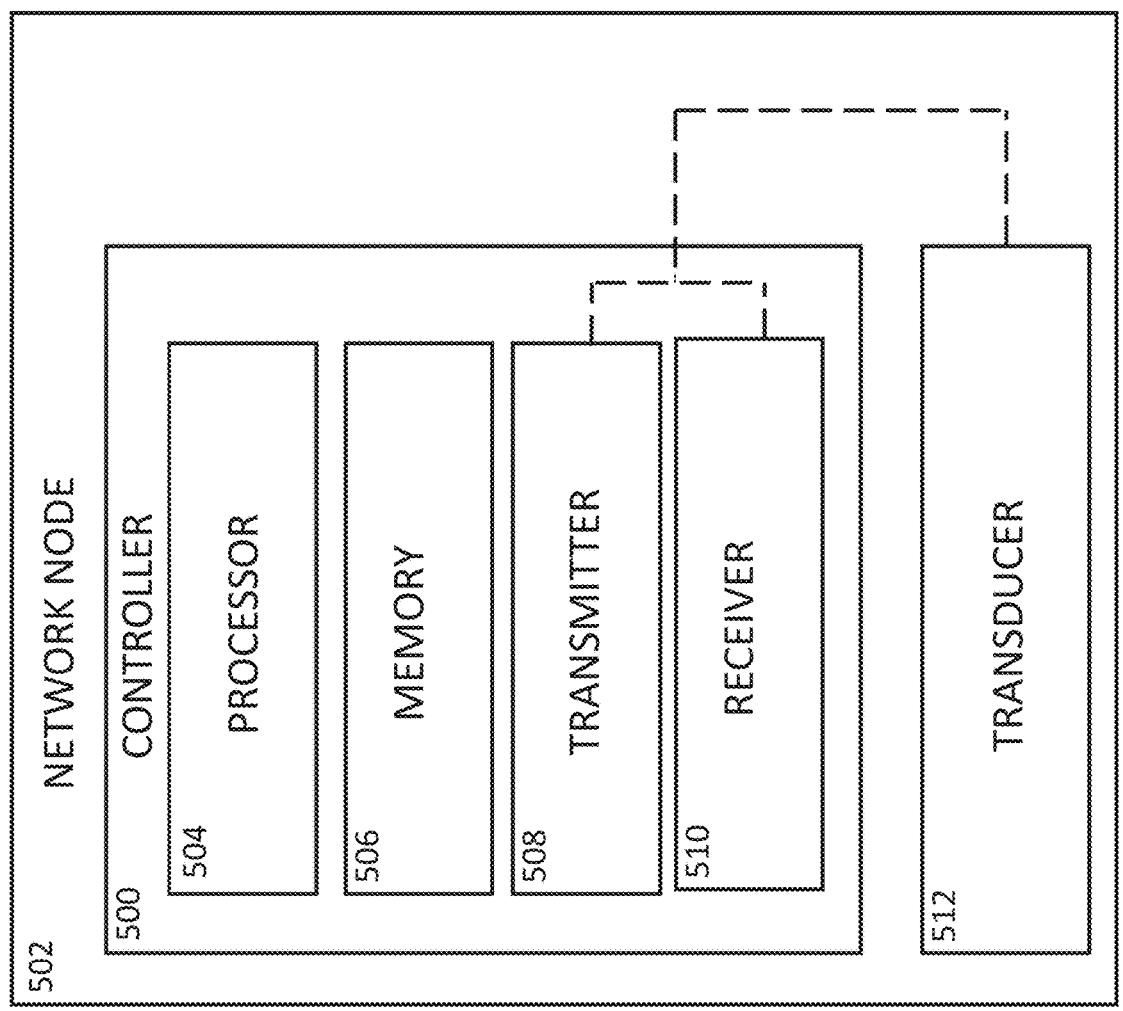
FIG. 5 is a block diagram illustrating at least one node of the notification system, in accordance with one or more embodiments of the present disclosure.

In general, FIG. 5 illustrates a block diagram of at least one node in the notification system, in accordance with one or more embodiments of the present disclosure. In some embodiments, the network node 502 may include a controller 500. The controller 500 provides processing functionality for the at least one node 502 and may include one or more processors 504. The one or more processors 504 may include any processors 504 used in the art including, but not limited to, field programmable gate arrays (FPGA), and application-specific integrated circuits (ASIC). The controller 500 may utilize the one or more processors 504 to receive and decode incoming transmissions and recode and retransmit the relayed transmissions. In some embodiments, the controller 600 may include a transducer 512. For example, the transducer 512 may function as an antenna configured to convert between electrical signals and electromagnetic waves. By way of another example, the transducer may include one or more transmitters 508 and/or one or more receivers 510. By way of another example, the one or more receivers may include one or more scanning receivers or staring receivers. The controller 500 may also include resident or external memory 506 for storing data, executable code, and other information accessed or generated by the at least one node 502. The controller 500 may execute one or more software programs embodied in a non-transitory computer readable medium (e.g., a memory 506) that implements techniques described herein. The controller 500 is not limited by the materials from which it is formed or the processing mechanisms employed therein.

The memory 506 may be an example of a tangible, computer-readable storage medium that provides storage functionality to store various data and/or program code associated with operation of the at least one node 502 and/or controller 500, such as software programs and/or code segments, or other data to instruct the controller 500, and possibly other components of the at least one node 502. The memory 506 may store data, such as a set of program instructions for operating the at least one node 502 and/or incoming data from the initial notification signal or the algorithmically related initial notification signal. It should be noted that while a single memory 506 is described, a wide variety of types and combinations of memory 506 (e.g., tangible, non-transitory memory) may be employed. The memory 506 may be integral with the controller 500, may comprise stand-alone memory, or may be a combination of both. Some examples of the memory 506 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

Figure 6:
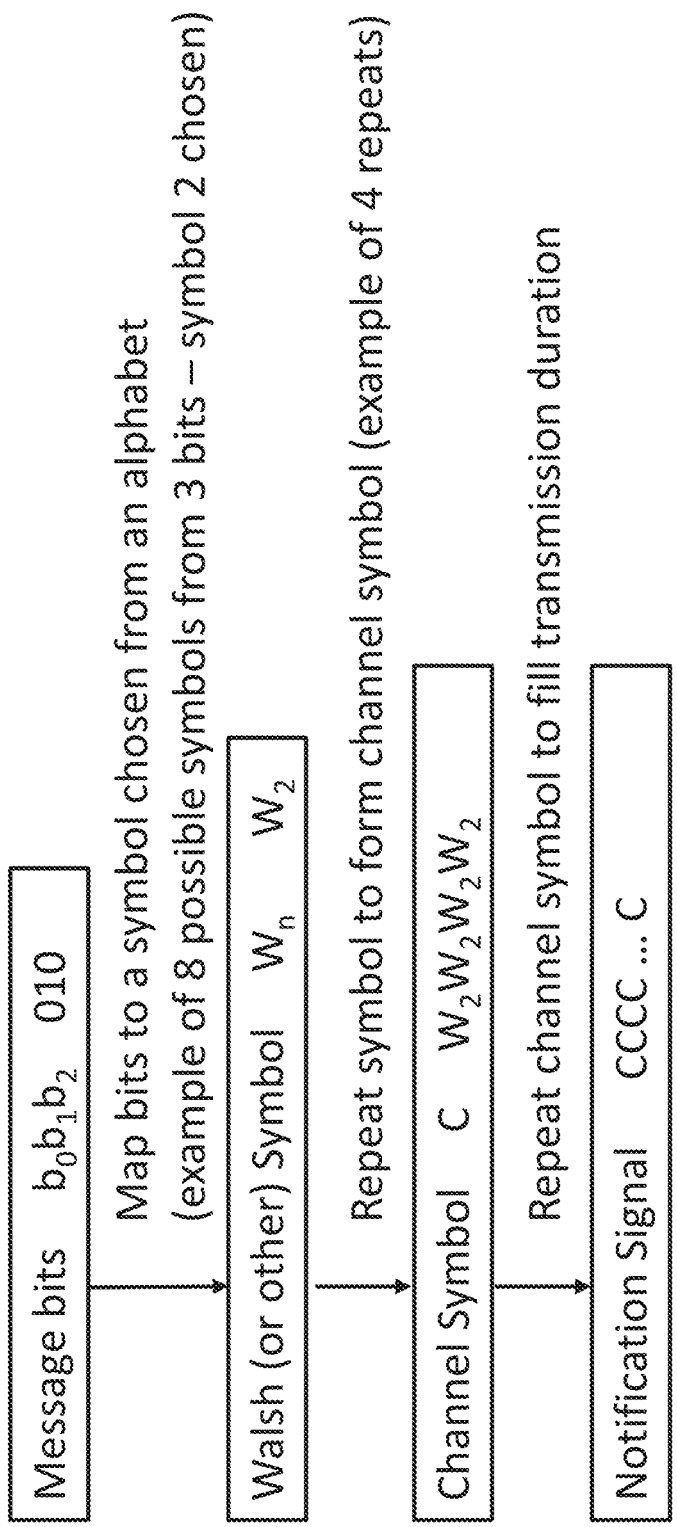
FIGS. 6 and 7 are flow diagrams illustrating symbol mapping to one or more channel symbols, in accordance with one or more embodiments of the present disclosure.
Figure 7:
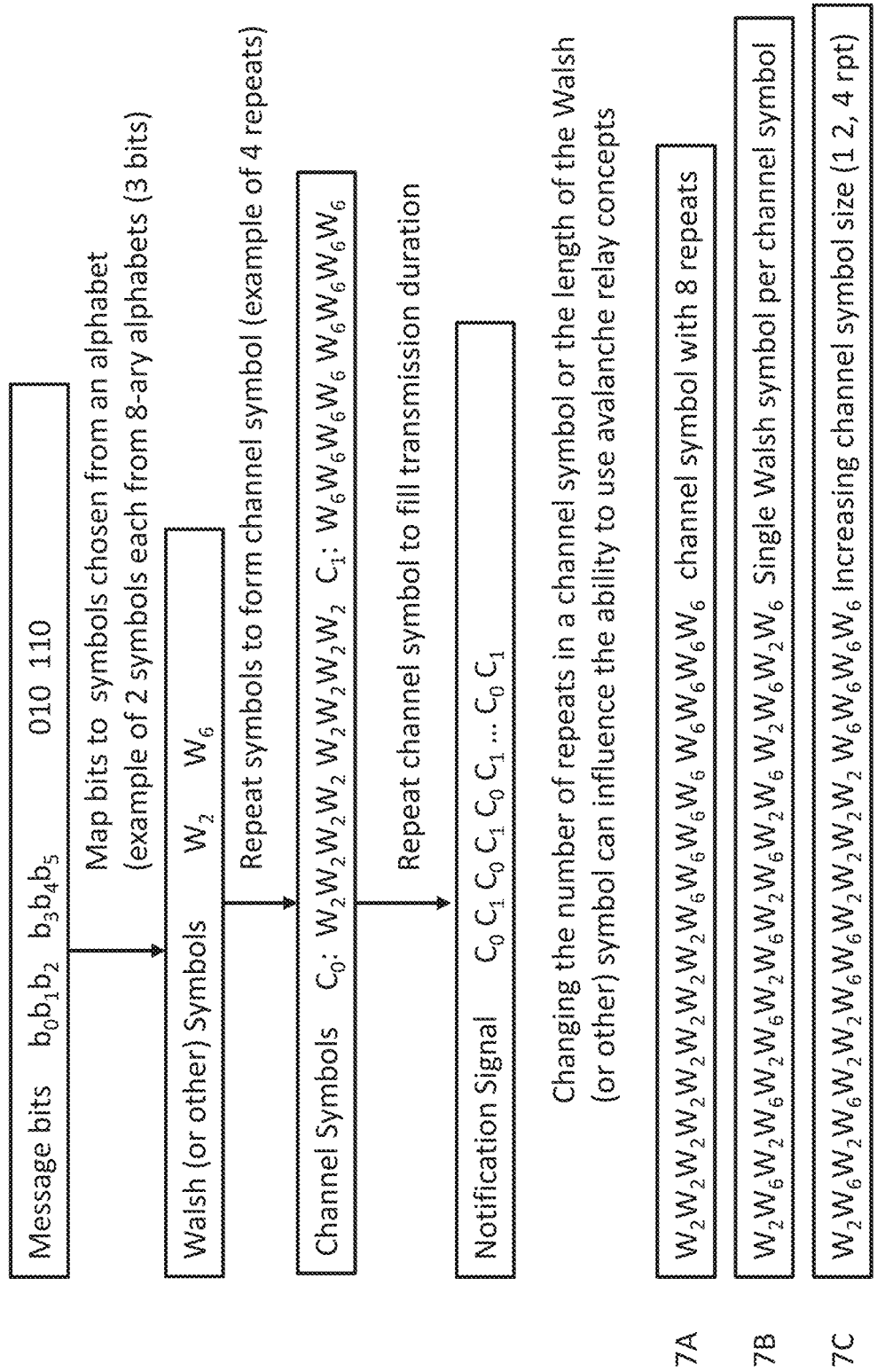

In general, FIGS. 6-7 are flow diagrams illustrating symbol mapping to one or more channel symbols, according to the inventive concepts disclosed herein. In some embodiments, the same general approach may be extended to cases where messages are comprised of multiple distinct channel symbols. In order to activate avalanche relays as quickly as possible, it may be desirable to start with a relatively high code rate (e.g., short duration) signal comprised of two or more distinct channel symbols that may repeat throughout the transmission. If the format of the transmission is known, any receiver can immediately start a synchronized avalanche relay transmission once it is in possession of the message. Using a high code rate signal minimizes the time to acquire the message for nodes that have good signal-to-noise ratio (SNR). In currently preferred operation, the transmission may consist of multiple repeats of the same message, encoded as repetitions of Walsh symbols within larger channel symbols. This is illustrated in FIG. 6, where 3 message bits are encoded into a single 8-ary Walsh symbol and the Walsh symbol is repeated n times, with n=4 in the example. As a further illustrative example, if 128 chips were comprised of 8 8-ary Walsh symbols and 6 bits were to be transmitted, one approach may include encoding the first three bits as a Walsh symbol and repeating that symbol 8 times to form a channel symbol. Then, the second pair of bits may be encoded in a second Walsh symbol and repeat that symbol 8 times to form a second channel symbol, for a total of 128 chips (in two 64 chip channel symbols) needed to pass the 6 bits, illustrated as 7A in FIG. 7.

It is noted herein that the approach mentioned above may be utilized when maximizing the probability that the signal is received correctly at the end of the 128 chips. However, when a slotless avalanche relay system is utilized, a second approach may include providing for the possibility of early detection and retransmission by encoding the Walsh symbols in pairs which may provide all 6 bits and then repeating the Walsh symbol pairs, illustrated as 7B in FIG. 7. The difference would be that for receivers with good SNR, the message would be known after the first 16 chips (first of 8 repeats of Walsh symbol pairs) in the second approach, or at the end of the first transmission of the second Walsh symbol after 72 chips in the first approach. Receivers in possession of the message could (almost) immediately commence a synchronized transmission matching the initial transmitter. As the number of distinct Walsh symbols used to encode the message increases (i.e., longer messages), the advantage associated with repeating the message rather than repeating the Walsh symbols becomes more prominent when avalanche relay retransmissions are possible.

In some embodiments, it may be desirable to repeat the individual Walsh (or other) symbol one or more times to form a channel symbol before concatenation with subsequent Walsh symbols encoding the message, but with the intent that a minimum number of repetitions of a Walsh symbol within a channel symbol should be employed when the intent is to provide for early detection and retransmission in an avalanche relay scheme. The use of 8-ary Walsh symbols may be illustrative only, and symbols of arbitrary size may be employed. Additionally, orthogonal or near orthogonal modulations of other types may also be possible. The Walsh channel symbol structure may vary in some embodiments, progressing from lower numbers of chips per Walsh channel symbol early in a transmission to longer channel symbols later in the transmission, either by changing the number of repetitions of Walsh symbols in the channel symbol, illustrated as 7C in FIG. 7, or by increasing the length of the Walsh symbol or both. In practice, increasing channel symbol length over the duration of the transmission provides early relay activation with shorter channel symbols at the beginning while maximizing coherent gain as transmission (retransmissions) progress with longer channel symbols, thus, enhancing the opportunity to reach nodes in poor SNR conditions.

In some preferred embodiments a known Walsh symbol (or known signal) is periodically inserted to allow receivers to get updated channel impulse response estimates to facilitate additional retransmitters (repeaters) joining the network after a notification transmission is initiated.

Thus, the many advantages of embodiments of the present invention over prior art systems and apparatus include, for example: the ability to leverage nodes having an SNR sufficient to quickly receive a notification and begin retransmitting so as to facilitate rapid dissemination of retransmission by nodes in positions having sufficient SNRs to receive and retransmit the notification. This increases the likelihood of message propagation and the robustness and speed of a network of the instant invention.

It should be noted the methods described herein for modifying, delaying, otherwise adapting signals received and/or transmitted by the nodes may be performed by the components operating within the node including but not limited to the one or more controllers 500, memory 506, or the one or more processors 504.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A notification system, comprising:
   (a) one or more repeater stations, said one or more repeater stations configured to detect and receive a message;
   (b) a sending station comprising:
      at least one transducer;
      a transmitter coupled to the at least one transducer, the transmitter configured to transmit the message over a channel; and
      a transmitter controller associated with the transmitter, the transmitter controller including at least one processor configured to:
         transmit the message to the one or more repeater stations; and
   (c) each of said one or more repeater stations comprising:
      at least one transducer; and
      a repeater controller including at least one of one or more receivers and one or more transmitters, wherein the one or more receivers and the one or more transmitters are coupled to the at least one transducer, and including at least one repeater processor configured to:
         detect the message that was transmitted over a channel;
         receive the detected message; and
         repeat the message over the channel coordinated to align with the received message, wherein the message is repeated at least one of simultaneously or in coordination upon receipt of the message.

2. The notification system of claim 1, further comprising:
   at least one receiver station comprising:
      at least one transducer;
      at least one receiver coupled to the at least one transducer; and
      a receiver controller coupled to the at least one receiver and including at least one receiver processor configured to detect and receive the message over a channel, wherein the coordination of the message is managed by at least one of the transmitter controller or the repeater controller.

3. The notification system of claim 1, wherein said message includes transmission end time, wherein the transmission end time is at least one of a fixed time, a timing indicator, or a sequence.

4. The notification system of claim 3, wherein said message is configured to signal at least one of a defined end time or a timing reference which allows a node receiving the message to determine an end time.

5. The notification system of claim 1, wherein said transmitting of the message comprises multiple repeats of a same message.

6. The notification system of claim 1, wherein at least one of one or more known channel symbols or known signals are periodically inserted in the message to allow the receivers to get updated channel impulse response estimates so as to facilitate additional repeaters joining the notification system after the transmitting of the message is initiated.

7. The notification system of claim 1 further comprising one or more bearers in communication with said sending station.

8. The notification system of claim 7, wherein said one or more bearers include terrestrial bearers.

9. The notification system of claim 1, wherein the at least one transducer is configured to couple at least one of electrical signals by acoustical means and acoustical signals by electrical means, allowing the notification system to transmit data underwater.

10. The notification system of claim 1, wherein the at least one transducer is configured as an antenna.

11. The notification system of claim 10, further comprising at least one receiver station comprising at least one staring receiver.

12. The notification system of claim 2, wherein said transmitting of the message is aligned by at least one of altering timing to spread the transmitting of the message out within a multipath tolerance window of the at least one receiver station, or by compensating for propagation delay.

13. A notification system, comprising:
    (a) one or more repeater stations, said one or more repeater stations configured to detect and receive a message, said message encoded in at least two distinct channel symbols;
    (b) each repeater station of the one or more repeater stations comprising:
       at least one transducer; and
       a repeater controller including at least one of one or more receivers and one or more transmitters, wherein the one or more receivers and the one or more transmitters are coupled to the at least one transducer, and including at least one repeater processor configured to:
          detect the message that was transmitted over a channel;
          receive the detected message; and
          repeat the message over the channel coordinated to align with the received message, wherein the message is repeated at least one of simultaneously or in coordination upon receipt of the message; and
    (c) at least one receiver station comprising:
       at least one transducer;
       at least one receiver coupled to the at least one transducer; and
       a receiver controller coupled to the receiver and including at least one receiver processor configured to detect and receive the message over the channel, wherein the coordination of the message is managed by at least one of the transmitter controller or the repeater controller.

14. The notification system of claim 13, wherein said at least two distinct channel symbols are repeated one or more times.

15. The notification system of claim 13, wherein at least one of one or more known channel symbols or known signals are periodically inserted in the message to allow the receivers to get updated channel impulse response estimates so as to facilitate additional repeaters joining the notification system after the transmitting of the message is initiated.

16. The notification system of claim 13, wherein structures of said at least two distinct channel symbols vary.

17. The notification system of claim 16, wherein the varying of said at least two distinct channel symbols comprises a progressing from a first number of chips per symbol to a higher number of chips per symbol.

18. The notification system of claim 17, wherein a number of repetitions of said at least two distinct channel symbols varies.

19. The notification system of claim 18, wherein at least one of the number of repetitions of said at least two distinct channel symbols in a codeword increases or a length of said at least two distinct channel symbols increases.

20. The notification system of claim 13, wherein the notification system includes one or more staring receivers.

* * * * *